(12) United States Patent
Matsumura et al.

(10) Patent No.: US 12,446,042 B2
(45) Date of Patent: Oct. 14, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Weiqi Sun, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 380 days.

(21) Appl. No.: 18/040,339

(22) PCT Filed: Aug. 7, 2020

(86) PCT No.: PCT/JP2020/030456
§ 371 (c)(1),
(2) Date: Feb. 2, 2023

(87) PCT Pub. No.: WO2022/030011
PCT Pub. Date: Feb. 10, 2022

(65) Prior Publication Data
US 2023/0276447 A1    Aug. 31, 2023

(51) Int. Cl.
*H04W 72/21* (2023.01)
*H04L 1/08* (2006.01)
*H04W 72/04* (2023.01)

(52) U.S. Cl.
CPC .............. *H04W 72/21* (2023.01); *H04L 1/08* (2013.01); *H04W 72/04* (2013.01)

(58) Field of Classification Search
CPC ......... H04L 1/189; H04L 1/08; H04L 1/1896; H04L 1/1861; H04L 1/1854; H04L 1/0072; H04L 5/0055; H04L 1/0026; H04W 72/04; H04W 72/21; H04W 16/28; H04W 72/232
See application file for complete search history.

(56) References Cited

U.S. PATENT DOCUMENTS

| | | | |
|---|---|---|---|
| 11,611,468 B2 * | 3/2023 | Zhou ..................... | H04W 76/19 |
| 2020/0205150 A1 | 6/2020 | Cheng et al. | |
| 2022/0201506 A1 * | 6/2022 | Fu .......................... | H04L 5/0094 |
| 2022/0393823 A1 * | 12/2022 | Fan ....................... | H04L 1/1819 |
| 2022/0400501 A1 * | 12/2022 | Kang .................... | H04L 5/0048 |
| 2023/0007534 A1 * | 1/2023 | Wu ........................ | H04L 5/0044 |

(Continued)

FOREIGN PATENT DOCUMENTS

CN         110536399 A      12/2019

OTHER PUBLICATIONS

Office Action issued in Chinese Application No. 202080105915.2, mailed Sep. 3, 2024 (16 pages).

(Continued)

*Primary Examiner* — Brian D Nguyen
(74) *Attorney, Agent, or Firm* — Osha Bergman Watanabe & Burton LLP

(57) ABSTRACT

A terminal according to an aspect of the present disclosure includes: a control section that determines a plurality of physical uplink control channel (PUCCH) resources on the basis of downlink control information; and a transmitting section that performs PUCCH repeated transmission by using the plurality of PUCCH resources. According to an aspect of the present disclosure, suitable PUCCH repeated transmission can be implemented.

6 Claims, 7 Drawing Sheets

| PUCCH RESOURCE AND SPATIAL RELATION | PUCCH REPETITION |
|---|---|
| FIRST PUCCH RESOURCE with FIRST SPATIAL RELATION | FIRST REPETITION |
| SECOND PUCCH RESOURCE with FIRST SPATIAL RELATION | SECOND REPETITION |
| ... | ... |
| M-TH PUCCH RESOURCE with FIRST SPATIAL RELATION | M-TH REPETITION |
| FIRST PUCCH RESOURCE with SECOND SPATIAL RELATION | (M + 1)-TH REPETITION |
| ... | ... |
| M-TH PUCCH RESOURCE with SECOND SPATIAL RELATION | 2M-TH REPETITION |
| ... | ... |

(56) References Cited

U.S. PATENT DOCUMENTS

2023/0023719 A1* 1/2023 Ji .......................... H04W 16/28
2023/0048329 A1* 2/2023 Kang ................ H04W 72/1268
2023/0209567 A1* 6/2023 Grossmann ......... H04W 72/232
370/329

OTHER PUBLICATIONS

Office Action issued in Japanese Application No. 2022-541088, mailed Aug. 13, 2024 (8 pages).
ZTE: "Preliminary views on further enhancement for NR MIMO"; 3GPP TSG RAN WG1 Meeting #101-e, R1-2003483; e-Meeting, May 25-Jun. 5, 2020 (20 pages).
Office Action issued in Chinese Patent Application No. 202080105915.2, dated Feb. 5, 2025 (14 pages).
Office Action issued in counterpart Chinese Patent Application No. 202080105915.2 mailed on Apr. 23, 2024 (14 pages).
International Search Report issued in PCT/JP2020/030456 on Dec. 28, 2020 (2 pages).
Written Opinion of the International Searching Authority issued in PCT/JP2020/030456 on Dec. 28, 2020 (3pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010 (149 pages).

* cited by examiner

| PRI | PUCCH RESOURCE |
|---|---|
| PRI#0 | {PUCCH RESOURCE #0, #1} |
| PRI#1 | {PUCCH RESOURCE #3, #5} |
| ⋮ | ⋮ |

FIG. 1A

| PRI | PUCCH RESOURCE |
|---|---|
| PRI#0 | {PUCCH RESOURCE #0, #3}, {PUCCH RESOURCE #1, #4}, {PUCCH RESOURCE #2, #5} |
| PRI#1 | {...}, {...}, {...} |
| ⋮ | ⋮ |

| PRI | PUCCH REPETITION |
|---|---|
| FIRST PRI | FIRST REPETITION (TRANSMISSION OCCASION) |
| SECOND PRI | SECOND REPETITION (TRANSMISSION OCCASION) |
| ... | ... |
| N-TH PRI | N-TH REPETITION (TRANSMISSION OCCASION) |

FIG. 2B

| PRI | PUCCH REPETITION |
|---|---|
| FIRST PRI | FIRST REPETITION (TRANSMISSION OCCASION) |
| SECOND PRI | SECOND REPETITION (TRANSMISSION OCCASION) |
| ... | ... |
| M-TH PRI | M-TH REPETITION (TRANSMISSION OCCASION) |
| FIRST PRI | (M + 1)-TH REPETITION (TRANSMISSION OCCASION) |
| ... | ... |

FIG. 3A

| PUCCH RESOURCE AND SPATIAL RELATION | PUCCH REPETITION |
|---|---|
| FIRST PUCCH RESOURCE with FIRST SPATIAL RELATION | FIRST REPETITION |
| ⋮ | ⋮ |
| FIRST PUCCH RESOURCE with P-TH SPATIAL RELATION | P-TH REPETITION |
| SECOND PUCCH RESOURCE with FIRST SPATIAL RELATION | (P + 1)-TH REPETITION |
| ⋮ | ⋮ |
| SECOND PUCCH RESOURCE with P-TH SPATIAL RELATION | 2P-TH REPETITION |
| ⋮ | ⋮ |

FIG. 3B

| PUCCH RESOURCE AND SPATIAL RELATION | PUCCH REPETITION |
|---|---|
| FIRST PUCCH RESOURCE with FIRST SPATIAL RELATION | FIRST REPETITION |
| SECOND PUCCH RESOURCE with FIRST SPATIAL RELATION | SECOND REPETITION |
| ⋮ | ⋮ |
| M-TH PUCCH RESOURCE with FIRST SPATIAL RELATION | M-TH REPETITION |
| FIRST PUCCH RESOURCE with SECOND SPATIAL RELATION | (M + 1)-TH REPETITION |
| ⋮ | ⋮ |
| M-TH PUCCH RESOURCE with SECOND SPATIAL RELATION | 2M-TH REPETITION |
| ⋮ | ⋮ |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a universal mobile telecommunications system (UMTS) network, specifications of long term evolution (LTE) have been drafted for the purpose of further increasing data rates, providing low latency, and the like (Non Patent Literature 1). In addition, the specifications of LTE-Advanced (3GPP Rel. 10 to 14) have been drafted for the purpose of further increasing capacity and advancement of LTE (third generation partnership project (3GPP) release (Rel.) 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In Rel. 15 NR, a user terminal (user equipment (UE)) may be configured with spatial relation information (which may be referred to as SRI) regarding a physical uplink control channel (PUCCH). In Rel-15 NR, control is made such that one piece of PUCCH SRI is active for one PUCCH resource at a given time.

In NR, a scheme in which the UE repeatedly transmits a PUCCH to a plurality of transmission/reception points in order to improve the reliability of PUCCH is studied. The PUCCH repeated transmission may be referred to as PUCCH repetition.

However, according to the conventional NR specifications, PUCCH repeated transmission can be performed only on the basis of one PUCCH resource, and PUCCH transmission cannot be flexibly controlled. In this case, for example, space diversity gain, high-rank transmission, etc. in a case where a plurality of transmission/reception points are used cannot be suitably implemented, and an increase in communication throughput may be suppressed.

Thus, an object of the present disclosure is to provide a terminal, a radio communication method, and a base station that can implement suitable PUCCH repeated transmission.

Solution to Problem

A terminal according to an aspect of the present disclosure includes: a control section that determines a plurality of physical uplink control channel (PUCCH) resources on the basis of downlink control information; and a transmitting section that performs PUCCH repeated transmission by using the plurality of PUCCH resources.

Advantageous Effects of Invention

According to an aspect of the present disclosure, suitable PUCCH repeated transmission can be implemented.

BRIEF DESCRIPTION OF DRAWINGS

FIGS. 1A and 1B are diagrams illustrating examples of a correspondence relationship between a PRI and a PUCCH resource according to a first embodiment.

FIGS. 2A and 2B are diagrams illustrating examples of a correspondence relationship between a PUCCH resource (PRI) and a repeated transmission occasion according to a second embodiment.

FIGS. 3A and 3B are diagrams illustrating examples of a correspondence relationship between a PUCCH resource (PRI) and a spatial relation (SRI), and a repeated transmission occasion according to a third embodiment.

DESCRIPTION OF EMBODIMENTS (Spatial Relation Information)

Figure 4:
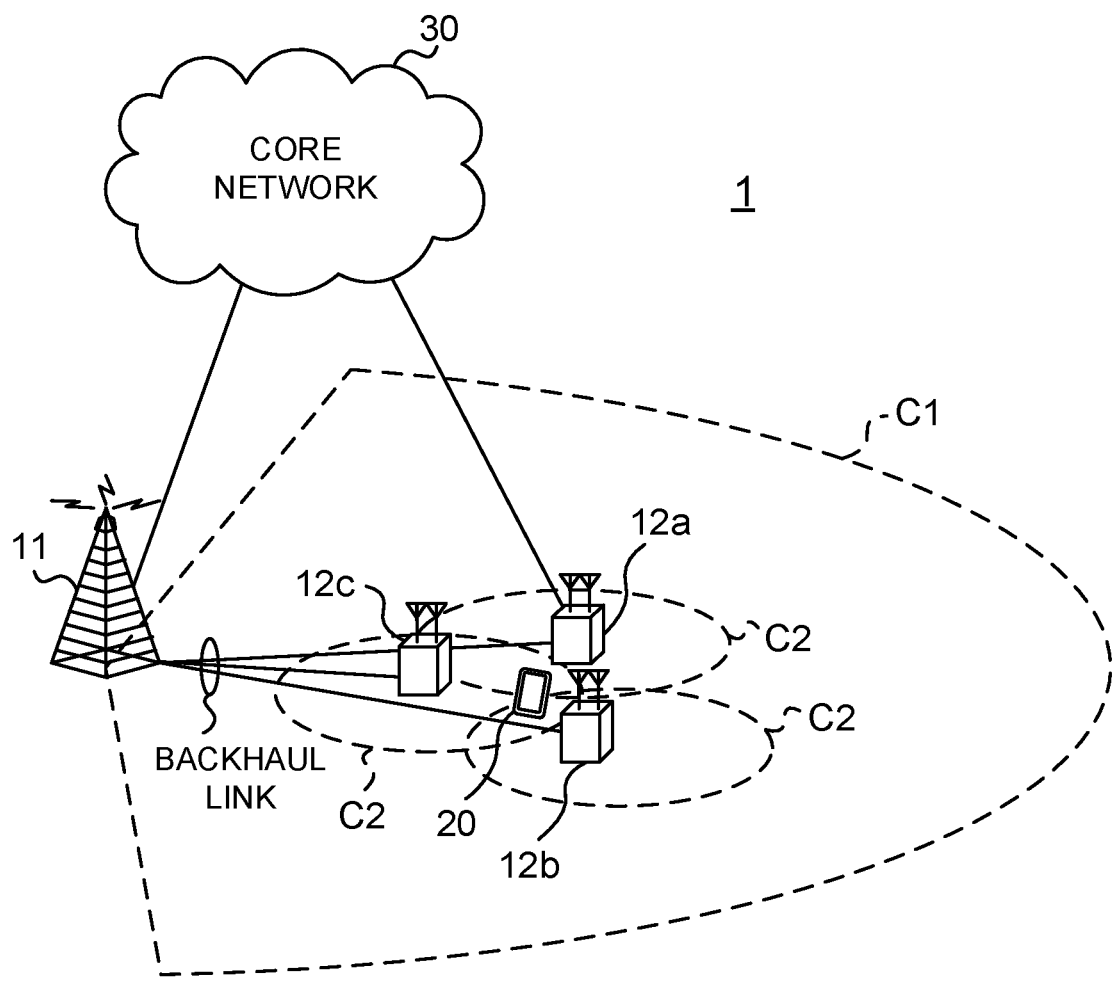
FIG. 4 is a diagram illustrating an example of a schematic configuration of a radio communication system according to one embodiment.

In the NR, the UE controls transmission processing (for example, at least one of transmission, mapping, precoding, modulation, and coding) of at least one of an uplink signal and a channel (also referred to as a signal/channel) on the basis of a given spatial relation.

A spatial relation applied to a given signal/channel may be specified by spatial relation information (SRI) notified (configured) using higher layer signaling.

Note that in the present disclosure, the higher layer signaling may be, for example, any one of radio resource control (RRC) signaling, medium access control (MAC) signaling, broadcast information, or a combination thereof.

The MAC signaling may use, for example, a MAC control element (MAC CE), a MAC protocol data unit (PDU), and the like. The broadcast information may be, for example, a master information block (MIB), a system information block (SIB), remaining minimum system information (RMSI), and other system information (OSI).

For example, in Rel-15 NR, spatial relation information between a given reference signal (RS) and an uplink control channel (physical uplink control channel (PUCCH)) (a "PUCCH-SpatialRelationInfo" information element of RRC) may be included in PUCCH configuration information (a "PUCCH-Config" information element of RRC) and configured in the UE.

The given RS may be, for example, at least one of a synchronization signal block (SSB), a channel state information reference signal (CSI-RS), and a sounding reference signal (SRS).

The configured SRI may include an SRI identifier (ID) for identifying the SRI. In addition, the SRI may include at least one of an SSB index, a CSI-RS resource ID, and an SRS resource ID, as the index of the given RS. Further, these spatial relation information may include a serving cell index, a bandwidth part (BWP) ID, and the like corresponding to the given RS.

When the spatial relation information related to SSB or CSI-RS and PUCCH is configured, the UE may transmit the PUCCH using a spatial domain filter same as the spatial domain filter for receiving the SSB or CSI-RS. That is, in this case, the UE may assume that the UE reception beam of the SSB or CSI-RS and the UE Tx beam of the PUCCH are the same.

When the spatial relation information about the SRS and the PUCCH is configured, the UE may transmit the PUCCH using the same spatial domain filter as the spatial domain filter for transmitting the SRS. That is, in this case, the UE may assume that the UE Tx beam of the SRS and the UE transmission beam of the PUCCH are the same.

Note that a spatial domain filter for transmission of a base station, a downlink spatial domain transmission filter, and a Tx beam of the base station may be replaced with each other. The spatial domain filter for reception of the base station, the uplink spatial domain receive filter, and the reception beam of the base station may be replaced with each other.

Further, a spatial domain filter for transmission of the UE, an uplink spatial domain transmission filter, and a Tx beam of the UE may be replaced with each other. The spatial domain filter for reception of the UE, the downlink spatial domain receive filter, and the reception beam of the UE may be replaced with each other.

The UE may be configured with SRI in units of PUCCH configurations (PUCCH-Config). The SRI configured by a PUCCH configuration may be applied to all PUCCH resources configured by the PUCCH configuration.

When more than one piece of the SRI regarding the PUCCH is configured, the UE may perform control so that one piece of the PUCCH SRI is active with respect to one PUCCH resource at a given time, on the basis of a PUCCH spatial relation Activation/Deactivation MAC CE.

(Multi-TRPs)

In NR, studies are underway to perform UL transmission (for example, PUCCH transmission) to one or more transmission/reception points (TRPs) (multi-TRPs (MTRPs)).

As an example, in order to improve the reliability of PUCCH for use cases (or services) of ultra-high reliability and low latency (for example, Ultra-Reliable and Low Latency Communications (URLLC)), a scheme in which PUCCHs to which different pieces of SRI are applied are repeatedly transmitted to multiple TRPs is studied. The PUCCH repeated transmission may be referred to as PUCCH repetition. The repeated transmission may be simply referred to as repetition.

Note that the SRI may correspond to a beam. For example, the UE may assume that a PUCCH with a different SRI is transmitted using a different beam.

By PUCCH repeated transmission, an improvement in reception quality on the network side can be expected for PUCCH. However, in the current Rel. 15/16 NR, only the same PUCCH resource is allowed to be used for PUCCH repeated transmission.

Therefore, according to the conventional NR specifications, PUCCH repeated transmission cannot be flexibly controlled. In this case, for example, space diversity gain, high-rank transmission, etc. in a case where a plurality of transmission/reception points are used cannot be suitably implemented, and an increase in communication throughput may be suppressed.

Thus, the present inventors have conceived a method for implementing suitable PUCCH repeated transmission.

Hereinafter, embodiments according to the present disclosure will be described in detail with reference to the drawings. The radio communication methods according to the respective embodiments may be applied independently or in combination.

Note that in the present disclosure, "A/B" may indicate "at least one of A and B".

Note that, in the present disclosure, "activate", "deactivate", "instruct (or indicate)", "select", "configure", "update", "determine", and the like may be replaced with each other. Further, in the present disclosure, a sequence, a list, a set, a group, a cluster, a subset, and the like may be replaced with each other.

In the present disclosure, a panel, a beam, a panel group, a beam group, an uplink (UL) transmission entity, a TRP, spatial relation information (SRI), a spatial relation, a control resource set (CORESET), a physical downlink shared channel (PDSCH), a codeword, a base station, a given antenna port (for example, a demodulation reference signal (DMRS) port), a given antenna port group (for example, a DMRS port group), a given group (for example, a code division multiplexing (CDM) group, a given reference signal group, and a CORESET group), a given resource (for example, a given reference signal resource), a given resource set (for example, a given reference signal resource set), a CORESET pool, a PUCCH group (PUCCH resource group), a spatial relation group, a downlink TCI state (DL TCI state), an uplink TCI state (UL TCI state), a unified TCI state, and the like may be replaced with each other.

Note that, for single DCI, the i-th TRP (TRP #i) may mean the i-th TCI state, the i-th CDM group, or the like (i is an integer).

Note that, for multi-DCI, the i-th TRP (TRP #i) may mean a CORESET corresponding to the CORESET pool index=i, the i-th TCI state, the i-th CDM group, or the like (i is an integer).

The panel may relate to at least one of a group index of an SSB/CSI-RS group, a group index of a group-based beam report, and a group index of an SSB/CSI-RS group for a group-based beam report.

Further, the panel identifier (ID) and the panel may be replaced with each other. That is, a TRP ID and a TRP, a CORESET group ID and a CORESET group, and the like may be replaced with each other.

In the present disclosure, the index, the ID, the indicator, the resource ID may be replaced with each other. In the present disclosure, a list, a group, a cluster, a subset, and the like may be replaced with each other.

In the present disclosure, the simple term "spatial relation" may be read as a PUCCH spatial relation.

The PUCCH repetition of the present disclosure may be read as MTRP-based repetition, repeated transmission across MTRPs, Rel. 17 repetition, repetition using different spatial relations, repetition to different TRPs, or the like. Further, repetition and repeated transmission may be replaced with each other.

Further, in the following examples, the PUCCH is described as a PUCCH used for hybrid automatic repeat request acknowledgement (HARQ-ACK) transmission for a PDSCH; however, the PUCCH may be a PUCCH for at least one uplink control information (UCI) transmission such as a HARQ-ACK, an SR, or CSI (for example, aperiodic CSI), and may be read as any of these.

Note that, in the present disclosure, SRI may be read as PUCCH spatial relation information (SRI), an RRC parameter "Spatialrelationinfo", an SRI ID, or the like. Further, a plurality of spatial relations (SRI) in the present disclosure may be read as an SRI sequence, an SRI set, an SRI pattern, SRI applied to PUCCH repetition, or the like.

Note that, in the present disclosure, PUCCH repeated transmission using different spatial relations may be read as PUCCH repeated transmission using precoder cycling.

For the following embodiments, "a plurality of PUCCH resources" may mean a plurality of PUCCH resources indicated for repeated transmission by one or a plurality of pieces of DCI. The plurality of PUCCH resources may be allocated to different slots, or may be allocated to the same slot.

The DCI (or DCI format) in the following embodiments may be DCI for scheduling PDSCH (for example, DCI format 1_0, 1_1, or 1_2) (which may be referred to as DL assignment DCI).

(Radio Communication Method)

First Embodiment

A first embodiment relates to indication of a plurality of different PUCCH resources for PUCCH repeated transmission.

The DCI for scheduling PDSCH may include a PUCCH resource indicator (PRI) field for each PUCCH transmission occasion (in other words, PRI fields for all pieces of SRI). For example, in the case of repeated transmission toward two TRPs (in a case where two pieces of SRI are configured/activated/indicated), the DCI may include two PRI fields. By this configuration, a PUCCH resource for a PUCCH transmission occasion corresponding to each piece of SRI can be appropriately controlled.

The above DCI may include one PRI field indicating a PUCCH resource of each PUCCH transmission occasion. By this configuration, an increase in the size of DCI can be suppressed.

The UE may determine a PUCCH resource of a specific PUCCH transmission occasion (for example, the 1st PUCCH transmission occasion) on the basis of one PRI field indicated, and may determine a PUCCH resource for other PUCCH transmission occasions on the basis of a specific rule.

The UE may determine that the PUCCH resource of the other PUCCH transmission occasions is at a position obtained by adding a given time/frequency offset to the PUCCH resource of the 1st PUCCH transmission occasion. The given time/frequency offset may be determined in advance by specifications, may be configured in the UE by higher layer signaling, or may be judged on the basis of UE capability.

The UE may determine that the PUCCH resource of the other PUCCH transmission occasions is a PUCCH resource corresponding to a value obtained by adding or subtracting an offset to or from the value of the one indicated PRI field (or the remainder of division of the above value by the number of possible values of the PRI field). For example, in a case where the offset is '2' and the value of the one indicated PRI field is '1', the PUCCH resource for the other PUCCH transmission occasion may be determined by judging that a value of the PRI field=3 (=1+2) is notified. The offset may be determined in advance by specifications, may be configured in the UE by higher layer signaling, or may be judged on the basis of UE capability.

The UE may determine a PUCCH resource of each PUCCH transmission occasion on the basis of a correspondence relationship between the value of one PRI field indicated and the PUCCH resource (or the value of the PRI) of each PUCCH transmission occasion. The correspondence relationship may be prescribed in advance by specifications, may be configured/activated in the UE by higher layer signaling (for example, RRC signaling or a MAC CE), may be indicated by DCI, or may be judged on the basis of UE capability. By this configuration, the PUCCH resource of each PUCCH transmission occasion can be appropriately and flexibly indicated while an increase in the size of DCI is suppressed.

FIGS. 1A and 1B are diagrams illustrating examples of a correspondence relationship between a PRI and a PUCCH resource according to the first embodiment; Note that PRI #i may mean that the value of the PRI field is i.

FIG. 1A illustrates an example in which a correspondence relationship between a PRI and a PUCCH resource is indicated by RRC signaling alone. In this example, PRI #0 corresponds to two PUCCH resources ({PUCCH resource #0, #1}), and PRI #1 corresponds to two PUCCH resources ({PUCCH resource #3, #5}). The PUCCH resource set corresponding to PRI #i may be configured in the UE by, for example, configuring a higher layer parameter resourceList including a plurality of PUCCH resource IDs in the i-th entry.

When PRI #0 is indicated by DCI that triggers repeated PUCCH, the UE may use {PUCCH resource #0, #1} as a resource of the repeated PUCCH.

FIG. 1B illustrates an example in which a correspondence relationship between a PRI and a PUCCH resource is configured by RRC signaling and a MAC CE. In this example, PRI #0 corresponds to three PUCCH resource groups (or sets), and each group corresponds to two PUCCH resources ({PUCCH resource #0, #3}, {PUCCH resource #1, #4}, or {PUCCH resource #2, #5}).

In the UE, one PUCCH resource group may be activated per PRI index by a MAC CE. For example, when PRI #0 is indicated by DCI that triggers repeated PUCCH, the UE in which {PUCCH resource #1, #4} is activated for PRI #0 may use {PUCCH resource #1, #4} as a resource of the repeated PUCCH.

Note that, when a plurality of PUCCH resources (or a plurality of PUCCH resource groups) are configured/activated per PRI index, the UE may assume that PUCCH repetition across different TRPs is triggered by DCI.

According to the first embodiment described above, the UE can appropriately determine a plurality of PUCCH resources corresponding to PUCCH repetition.

Second Embodiment

A second embodiment relates to determination of a PUCCH resource used for each PUCCH transmission in a case where the number of times of MTRP repetition and the number of PUCCH resources indicated are different. Note that the PUCCH resource in the second embodiment may be read as PRI, SRI, a spatial relation, or the like.

The number of times of MTRP repetition may be configured/activated/indicated by higher layer signaling, DCI, or the like.

The UE may assume at least one of the following for the relationship between the configured/indicated number of times of MTRP repetition (herein, which is set to N) and the number of PUCCH resources indicated (herein, which is set to M):

M is equal to N;

M is allowed to be different from N (may be larger, may be smaller, or may be the same).

In a case where M=N, the UE may map the repetition (transmission occasion) and the PUCCH resource one-to-one in ascending or descending order.

In a case where M>N, the UE may apply specific N PUCCH resources among the indicated PUCCH resources to perform N times of repeated PUCCH transmission. The specific N PUCCH resources may correspond to, for example, at least one of the following:

the first N PUCCH resources;

the last N PUCCH resources;

N PUCCH resources satisfying a specific condition.

The N PUCCH resources satisfying a specific condition may be, for example, PUCCH resources corresponding to the smallest (or largest) N IDs regarding the PUCCH resource (for example, PUCCH resource IDs).

Note that the i-th (i=1, 2, . . . ) PUCCH resource among the specific N PUCCH resources may be used for the i-th transmission occasion.

In a case where M<N, the [mod(floor((i−1)/X), M)+1]-th PUCCH resource may be used for the i-th transmission occasion (repetition). Note that mod(A, B) means the remainder of division of A by B, and floor(C) represents the floor function of C.

Here, X may be referred to as a parameter for mapping PUCCH resources. The value of X may be configured by using a higher layer parameter. Further, the UE may judge the value of X on the basis of a mapping pattern. For example, the UE may judge that X=1 for mapping pattern 1, X=2 for mapping pattern 2, and X=4 for mapping pattern 3.

The value of X corresponding to the mapping pattern may be determined in advance by specifications, or may be configured in the UE by higher layer signaling. The mapping pattern may be read as an identifier regarding mapping, information regarding mapping, or the like.

FIGS. 2A and 2B are diagrams illustrating examples of a correspondence relationship between a PUCCH resource (PRI) and a repeated transmission occasion according to the second embodiment. FIG. 2A corresponds to the case of M>N, and FIG. 2B corresponds to the case of M<N. It is assumed that X=1.

In the example of FIG. 2A, the i-th PRI is mapped to the i-th transmission occasion (repetition). In the example of FIG. 2A, the {mod(i−1, M)+1}-th PRI is mapped to the i-th transmission occasion (repetition).

According to the second embodiment described above, in a case where a plurality of PUCCH resources are available, the UE can appropriately determine a PUCCH resource corresponding to each PUCCH repetition.

Third Embodiment

A third embodiment relates to determination of a PUCCH resource and a spatial relation used for each PUCCH transmission in a case where a plurality of PUCCH resources are indicated and one or a plurality of pieces of SRI (spatial relations) are indicated for each of the PUCCH resources.

The one or plurality of pieces of SRI corresponding to a PUCCH resource may be indicated by a specific field of DCI, may be configured/activated by higher layer signaling, or may be notified by using a combination of these.

Here, the specific field may be a PUCCH resource indicator (PRI) field, an SRI (spatial relation information) field, a transmission configuration indication (TCI) field, a field for controlling PUCCH (which may be referred to as, for example, a PUCCH control field), or the like, or may be expressed by a combination of a plurality of fields. Note that the size of the specific field may vary with the number of PUCCH resources indicated by DCI.

Herein, the configured/indicated number of times of MTRP repetition is set to N, the number of PUCCH resources indicated is set to M, and the number of pieces of SRI (spatial relations) corresponding to one PUCCH resource is set to P.

FIGS. 3A and 3B are diagrams illustrating examples of a correspondence relationship between a PUCCH resource (PRI) and a spatial relation (SRI), and a repeated transmission occasion according to the third embodiment. For simplicity, an example of N>2P is illustrated in FIG. 3A, and an example of N>2M is illustrated in FIG. 3B; however, the present invention is not limited thereto. Further, for simplicity, it is assumed that the number of spatial relations corresponding to each PUCCH resource is P; however, the number of corresponding spatial relations may be different between PUCCH resources.

FIG. 3A illustrates an example in which a PUCCH resource and a spatial relation are mapped in the order of first the PUCCH resource and second the spatial relation for repetition. In this example, available combinations of PUCCH resources and spatial relations are first arranged in ascending order of PUCCH resources, and then for the same i-th PUCCH resource, spatial relations are arranged in ascending order; these are mapped to repeated transmission occasions in ascending order.

Specifically, for the 1st to P-th PUCCH repetitions, the UE may perform transmission by using the 1st PUCCH resource, with the 1st to P-th spatial relations applied. For the (P+1)-th to 2P-th PUCCH repetitions, the UE may perform transmission by using the 2nd PUCCH resource, with the 1st to P-th spatial relations applied.

Note that, in the present disclosure, the i-th PUCCH resource may mean the PUCCH resource of which the place in the order of the indicated PUCCH resource set is the i-th, or may mean the PUCCH resource of which the PUCCH resource ID in the indicated PUCCH resource set is the i-th from the smallest side (or the largest side).

Further, in the present disclosure, the i-th spatial relation may mean the spatial relation of which the place in the order of the spatial relation set corresponding to a PUCCH resource is the i-th, or may mean the spatial relation of which the spatial relation ID in the spatial relation set corresponding to a PUCCH resource is the i-th from the smallest side (or the largest side).

FIG. 3B illustrates an example in which a PUCCH resource and a spatial relation are mapped in the order of first the spatial relation and second the PUCCH resource for repetition. In this example, available combinations of PUCCH resources and spatial relations are first arranged in ascending order of spatial relations, and then for the same i-th spatial relation, PUCCH resources are arranged in ascending order; these are mapped to repeated transmission occasions in ascending order.

Specifically, for the 1st to M-th PUCCH repetitions, the UE may perform transmission by applying the 1st spatial relation, with the 1st to M-th PUCCH resources used. For the (M+1)-th to 2M-th PUCCH repetitions, the UE may perform transmission by applying the 2nd spatial relation, with the 1st to M-th PUCCH resources used.

According to the third embodiment described above, in a case where a plurality of PUCCH resources are available, the UE can appropriately determine a PUCCH resource and a spatial relation corresponding to each PUCCH repetition.

Fourth Embodiment

A fourth embodiment relates to subslot-based PUCCH repetition.

The UE may support subslot-based PUCCH repetition using the same spatial relation (for one TRP), and may report capability information regarding this support to the network. In a case where a higher layer parameter indicating that subslot-based PUCCH repetition is enabled is configured in the UE, the UE may repeatedly transmit a PUCCH in units of subslots.

The UE may support subslot-based PUCCH repetition using at least one of indication of a plurality of PUCCH resources (for a plurality of TRPs) and a plurality of spatial relations per PUCCH resource, and may report capability information regarding this support to the network. In a case where a higher layer parameter indicating that subslot-based PUCCH repetition is enabled is configured in the UE and PUCCH repetition across MTRPs is configured in the UE, the UE may repeatedly transmit a PUCCH in units of subslots.

According to the fourth embodiment described above, the UE can appropriately use subslot-based PUCCH repetition.

Fifth Embodiment

A fifth embodiment relates to transmission timing (offset) of a plurality of PUCCH resources indicated.

The plurality of PUCCH resources may be allocated to different slots. In a case where the plurality of PUCCH resources are triggered by one piece of DCI, a field included in the DCI and used to indicate the timing from a PDSCH to HARQ feedback (a PDSCH-HARQ feedback timing indicator (PDSCH-to-HARQ feedback timing indicator) field, hereinafter also referred to as a HARQ timing field) may be extended from the HARQ timing field of the existing Rel. 15/16 DCI format 1_0/1_1/1_2.

The extended HARQ timing field may include M (M is the number of PUCCH resources indicated) or N (N is the configured/indicated number of times of MTRP repetition) HARQ timing fields of the existing Rel. 15/16, and each of these may correspond to the transmission timing of each PUCCH resource (transmission occasion).

The HARQ timing field included in DCI that triggers at least one of the plurality of PUCCH resources may not be extended from the HARQ timing field of the existing Rel. 15/16 (may be the same number of bits). One HARQ timing field may correspond to the transmission timings of a plurality of PUCCH resources (transmission occasions). That is, the UE may assume that, even with the same value of the HARQ timing field, the 1st PUCCH resource and the 2nd PUCCH resource indicate different transmission timings.

The correspondence relationship between the value of the HARQ timing field and the transmission timing of the i-th PUCCH resource (transmission occasion) may be determined in advance by specifications, may be configured by higher layer signaling, or may be determined on the basis of UE capability. For example, a higher layer parameter indicating the timing from a PDSCH to HARQ feedback (for example, dl-DataToUL-ACK) may be configured while being associated with a PUCCH resource.

The UE may determine the transmission timing of one PUCCH resource among a plurality of PUCCH resources (transmission occasions) on the basis of one HARQ timing field, and may judge that a timing obtained by adding or subtracting an offset to or from the transmission timing of the one PUCCH resource is the transmission timing of the other PUCCH resources. This offset may be referred to as an offset between PUCCH resources.

The offset may be determined in advance by specifications, may be configured in the UE by higher layer signaling, or may be judged on the basis of UE capability.

The plurality of PUCCH resources may be allocated to the same slot. The UE may judge that the transmission timings of a plurality of PUCCH resources indicated are the same (are the same slot). The UE may determine a common transmission timing of a plurality of PUCCH resources (transmission occasions) on the basis of one HARQ timing field. Note that, even in a case where a plurality of PUCCH resources are allocated to the same slot, the transmission timings of the PUCCH resources may be different like in the above case where a plurality of PUCCH resources are allocated to different slots.

According to the fifth embodiment described above, in a case where a plurality of PUCCH resources are available, the UE can appropriately determine the transmission timing of each PUCCH resource.

<Others>

At least one of the foregoing embodiments may be applied only to a UE that has reported a specific UE capability or supports the specific UE capability.

The specific UE capability may indicate at least one of the following:
- whether the UE supports PUCCH repetition or not;
- whether the UE supports a plurality of PUCCH resources for PUCCH repetition or not;
- whether the UE supports intra-slot PUCCH repetition or not;
- the maximum number of PUCCH resources for supported PUCCH repetition;
- the maximum number of pieces of SRI (or spatial relations) for each supported PUCCH resource;
- the maximum number of pieces of SRI (or spatial relations) for each supported slot (for PUCCH);
- the maximum number of PUCCH resources for repeated transmission for each supported slot;
- the maximum number of PUCCH resources indicated for a DCI format for HARQ-ACK feedback (e.g., DCI for scheduling PUCCH).

Further, at least one of the foregoing embodiments may be applied to a case where the UE is configured with specific information regarding the foregoing embodiments by higher layer signaling. For example, the specific information may be information indicating that different spatial relations for PUCCH transmission occasions are enabled, information indicating that different PUCCH resources for PUCCH repeated transmission are enabled, information indicating that PUCCH repetition across MTRPs is enabled, any RRC parameter for a specific release (for example, Rel. 17), etc.

Note that PUCCH repetition in each of the foregoing embodiments may correspond to at least one of inter-slot repetition, intra-slot repetition, inter-subslot repetition, intra-subslot repetition, and the like.

For a plurality of PUCCH resources of PUCCH repetition in each of the foregoing embodiments, one piece of UCI may be encoded in each PUCCH resource. That is, the same UCI may be transmitted by each of the plurality of PUCCHs. This operation may be referred to as UCI repetition. In the case of UCI repetition, when the base station can receive one PUCCH resource, the base station can decode the UCI.

The UCI may be encoded across the plurality of PUCCH resources. That is, one piece of UCI may be divided into the plurality of PUCCH resources and transmitted. This operation may be referred to as UCI encoding across a plurality of PUCCH resources (UCI encoding across multiple PUCCH resources). In the case of UCI encoding across a plurality of PUCCH resources, it is desirable for the base station to receive both PUCCH resources for decoding. When both PUCCH resources can be received with a given level or more of quality, an improvement in characteristics can be expected.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

FIG. 4 is a diagram illustrating an example of a schematic configuration of a radio communication system according to an embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is the MN, and an LTE (E-UTRA) base station (eNB) is the SN.

The radio communication system 1 may support dual connectivity between a plurality of base stations in the same RAT (for example, dual connectivity in which both the MN and the SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10" when the base stations 11 and 12 are not distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a frequency range 1 (FR1) or a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency bands, definitions, and the like of the FR1 and FR2 are not limited thereto, and, for example, the FR1 may correspond to a frequency band higher than the FR2.

Further, the user terminal 20 may perform communication in each CC using at least one of time division duplex (TDD) or frequency division duplex (FDD).

The plurality of base stations 10 may be connected by wire (e.g., an optical fiber or an X2 interface in compliance with common public radio interface (CPRI)) or wirelessly (e.g., NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of an evolved packet core (EPC), a 5G core network (5GCN), or a next generation core (NGC).

The user terminal 20 may a terminal that corresponds to at least one of communication methods such as LTE, LTE-A, and 5G.

In the radio communication system 1, a radio access method based on orthogonal frequency division multiplexing (OFDM) may be used. For example, in at least one of downlink (DL) or uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH), a physical broadcast channel (PBCH), a physical downlink control channel (PDCCH), or the like shared by the user terminals 20 may be used.

Further, in the radio communication system 1, as an uplink channel, a physical uplink shared channel (PUSCH), a physical uplink control channel (PUCCH), a physical random access channel (PRACH), or the like shared by the user terminals 20 may be used.

User data, higher layer control information, a system information block (SIB), and the like are transmitted on the PDSCH. The PUSCH may transmit the user data, higher layer control information, and the like. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH or the PUSCH.

Note that the DCI that schedules the PDSCH may be referred to as DL assignment, DL DCI, or the like, and the DCI that schedules PUSCH may be referred to as UL grant, UL DCI, or the like. Note that the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a given search space based on search space configuration.

One search space may correspond to a PDCCH candidate corresponding to one or more aggregation levels. One or more search spaces may be referred to as a search space set. Note that "search space" and "search space set", "search space configuration" and "search space set configuration", and "CORESET" and "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), or scheduling request (SR) may be transmitted on the PUCCH. A random access preamble for establishing connection with a cell may be transmitted on the PRACH.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) or a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, DMRSs may be referred to as "user terminal-specific reference signals (UE-specific Reference Signals)."

(Base Station)

Figure 5:
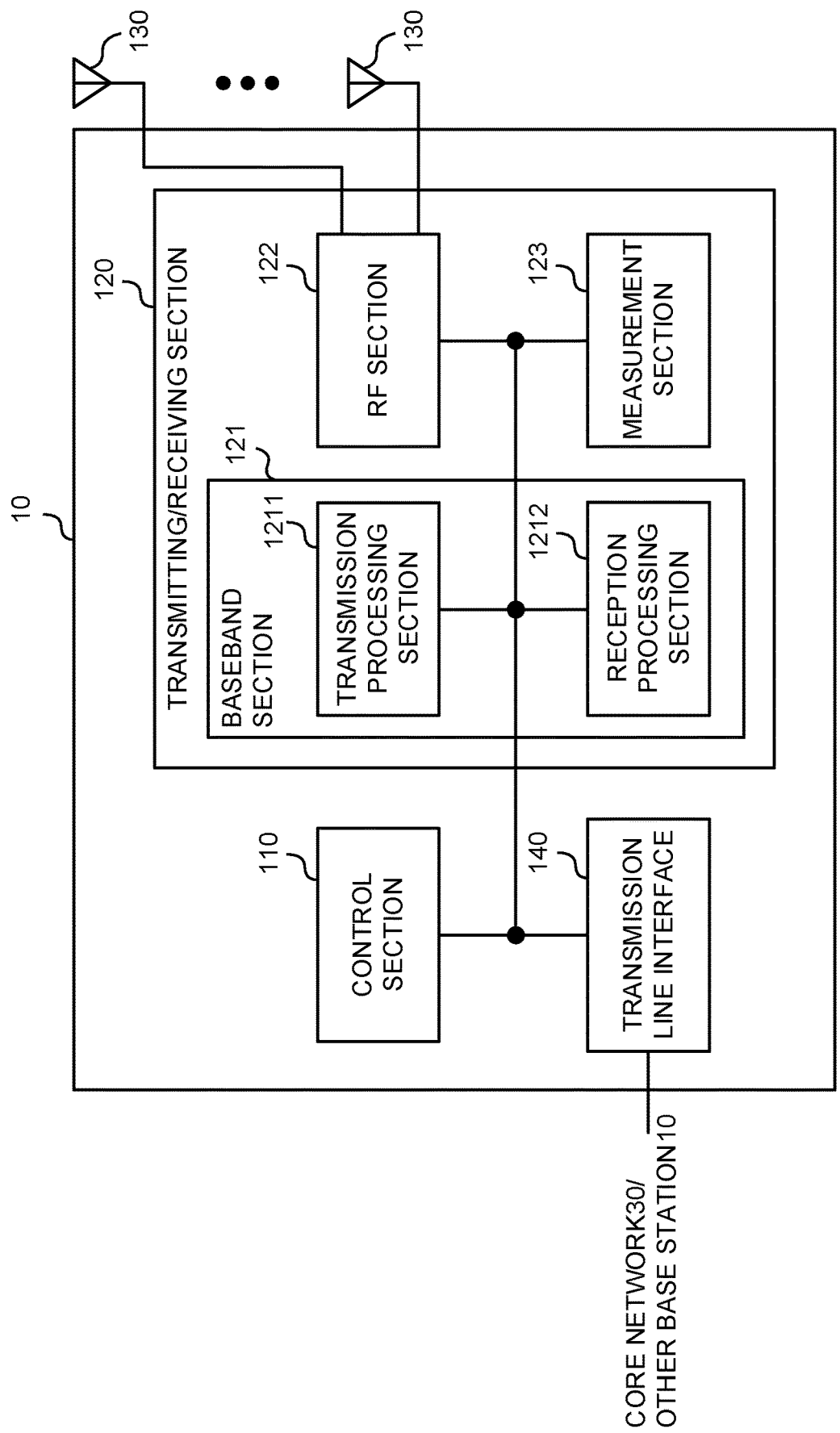
FIG. 5 is a diagram illustrating an example of a configuration of a base station according to one embodiment.

FIG. 5 is a diagram illustrating an example of a configuration of the base station according to one embodiment. The base station 10 includes a control section 110, a transmitting/receiving section 120, a transmission/reception antenna 130, and a transmission line interface 140. Note that one or more control sections 110, one or more transmitting/receiving sections 120, one or more transmission/reception antennas 130, and one or more transmission line interfaces 140 may be included.

Note that this example mainly describes a functional block which is a characteristic part of the present embodiment, and it may be assumed that the base station 10 also has another functional block necessary for radio communication. A part of processing of each section described below may be omitted.

The control section 110 controls the entire base station 10. The control section 110 can be implemented by a controller, a control circuit, and the like that are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 120 may be configured as an integrated transmitting/receiving section, or may be configured by a transmitting section and a receiving section. The transmitting section may include the transmission processing section 1211 and the RF section 122. The receiving section may be implemented by the reception processing section 1212, the RF section 122, and the measurement section 123.

The transmission/reception antennas 130 can be implemented by antennas described based on common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam or a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correcting encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital conversion, fast fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, another base stations 10, and the like, and may acquire, transmit, and the like user data (user plane data), control plane data, and the like for the user terminal 20.

Note that the transmitting section and the receiving section of the base station 10 in the present disclosure may include at least one of the transmitting/receiving section 120, the transmission/reception antenna 130, or the transmission line interface 140.

Note that the transmitting/receiving section 120 may transmit information indicating a plurality of pieces of spatial relation information (SRI) regarding one physical uplink control channel (PUCCH) resource.

The control section 110 may receive a plurality of PUCCH transmission occasions in the PUCCH resource transmitted by using spatial domain transmission filters based on the plurality of pieces of spatial relation information.

Further, the transmitting/receiving section 120 may transmit, to the user terminal 20, downlink control information including information of a plurality of physical uplink control channel (PUCCH) resources.

The transmitting/receiving section 120 may receive a PUCCH repeatedly transmitted from the user terminal 20 by using the plurality of PUCCH resources.

(User Terminal)

Figure 6:
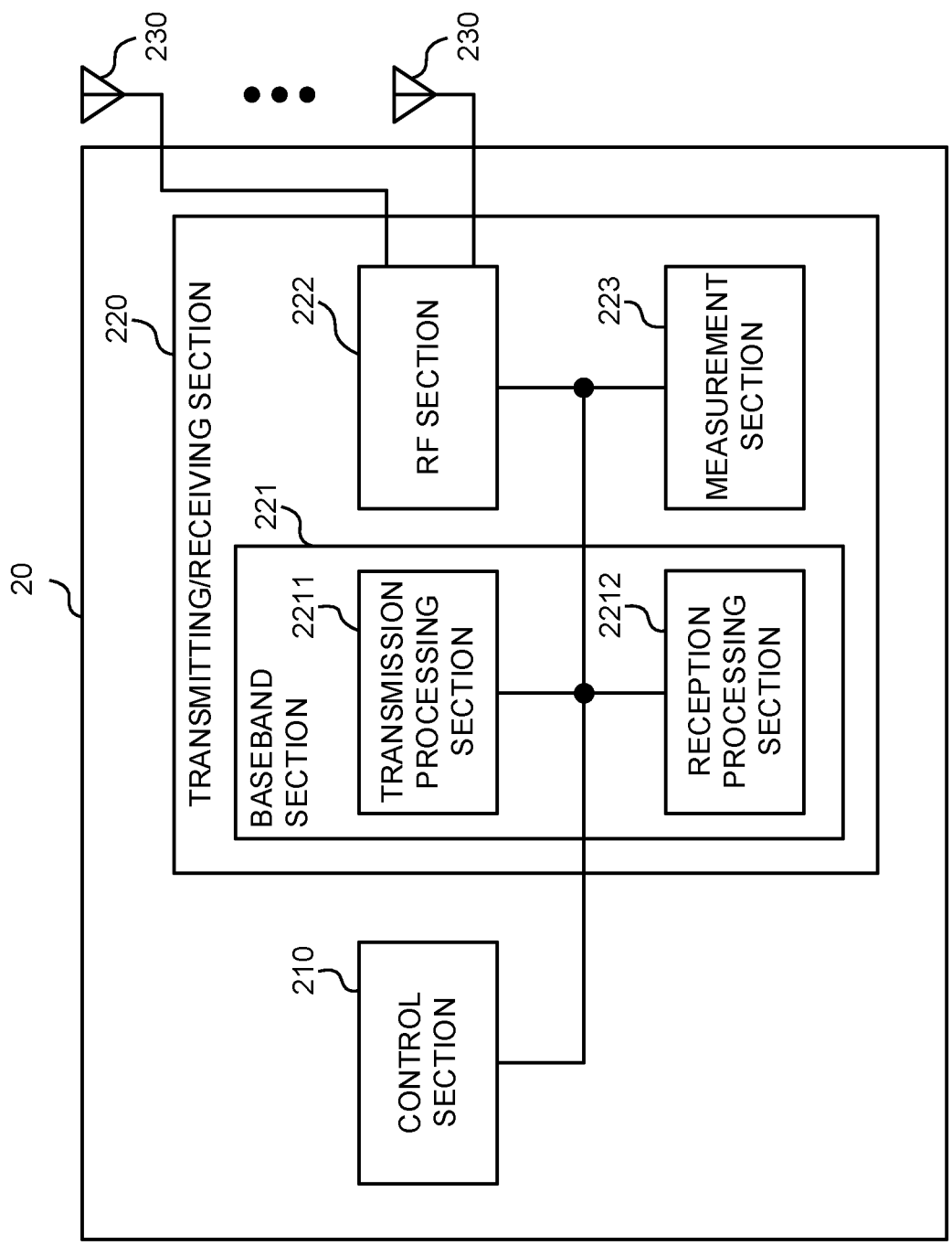
FIG. 6 is a diagram illustrating an example of a configuration of a user terminal according to one embodiment.

FIG. 6 is a diagram illustrating an example of a configuration of the user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data, control information, a sequence, and the like to be transmitted as signals, and may forward the data, control information, sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmitting/receiving circuit, and the like that are described based on common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmission/reception antenna 230 can include an antenna described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correcting encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. In a case where transform precoding is enabled for a given channel (e.g., PUSCH), the transmitting/receiving section 220 (transmission processing section 2211) may perform DFT processing as the transmission processing in order to transmit the channel using a DFT-s-OFDM waveform. In a case where it is not the case, DFT processing need not be performed as the transmission processing.

The transmitting/receiving section 220 (RF section 222) may perform modulation to a radio frequency band, filtering processing, amplification, and the like on the baseband signal, to transmit a signal in the radio frequency band via the transmission/reception antenna 230.

Meanwhile, the transmitting/receiving section 220 (RF section 222) may perform amplification, filtering processing, demodulation to a baseband signal, and the like on the signal in the radio frequency band received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 or the transmission/reception antenna 230.

Note that the control section 210 may determine a plurality of physical uplink control channel (PUCCH) resources on the basis of downlink control information.

The transmitting/receiving section 220 may perform PUCCH repeated transmission by using the plurality of PUCCH resources.

The control section 210 may assume that one PUCCH resource group activated by a medium access control (MAC) control element from among PUCCH resource groups (sets) configured by radio resource control (RRC) signaling corresponds to a value (index value) of one PUCCH resource indicator (PRI) field.

The control section 210 may assume that the number of the plurality of PUCCH resources and the number of times of the PUCCH repeated transmission are allowed to be different.

The control section 210 may map a PUCCH resource and a spatial relation in the order of first the PUCCH resource and second the spatial relation for each repetition.

(Hardware Configuration)

Note that the block diagrams that have been used to describe the above embodiments illustrate blocks in functional units. These functional blocks (components) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be realized by combining the one apparatus or the plurality of apparatuses with software.

Here, the function includes, but is not limited to, determining, judging, calculating, computing, processing, deriving, investigating, searching, ascertaining, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 7:
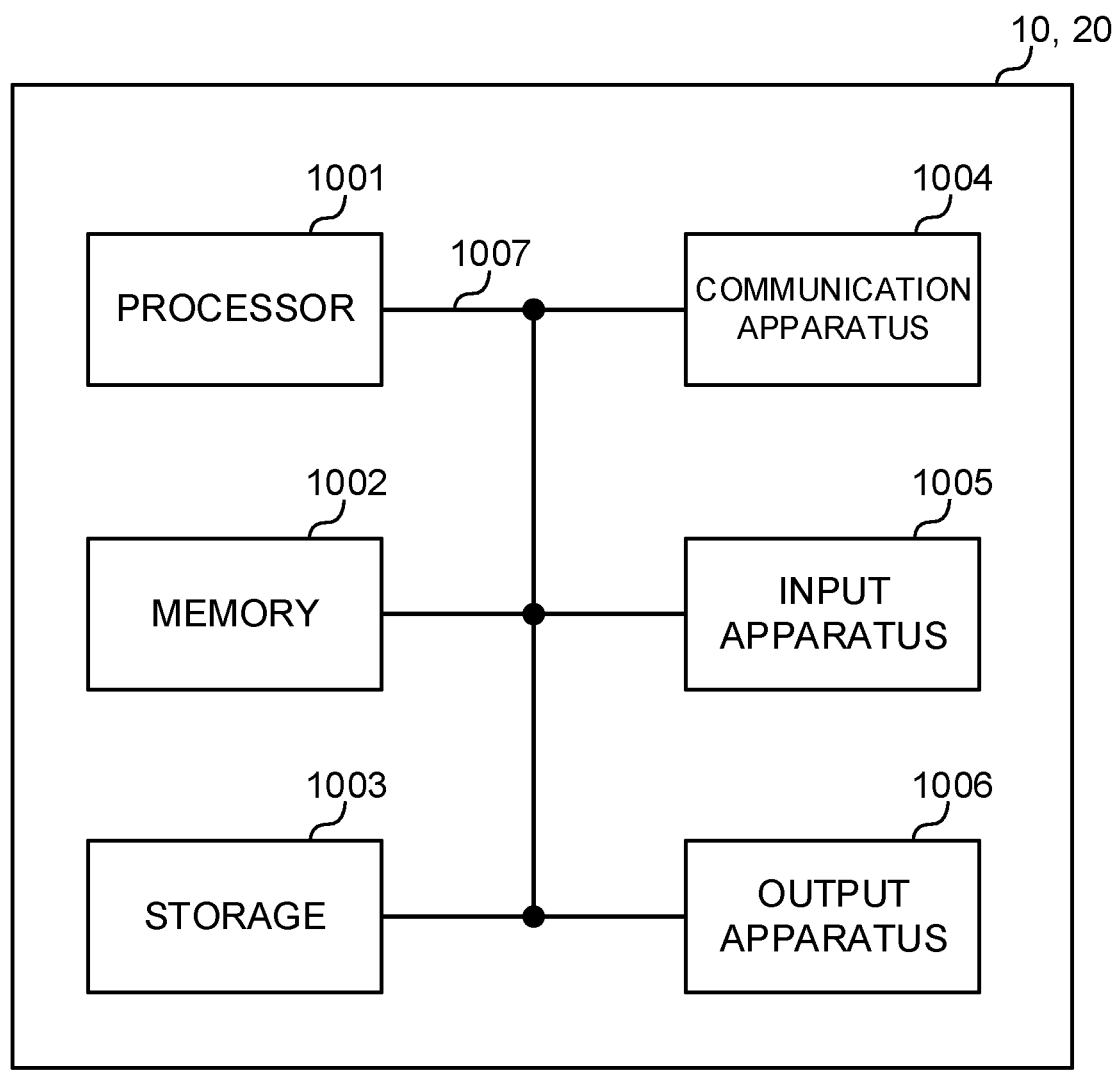
FIG. 7 is a diagram illustrating an example of a hardware configuration of the base station and the user terminal according to one embodiment.

For example, the base station, the user terminal, and the like according to one embodiment of the present disclosure may function as a computer that executes the processing of the radio communication method of the present disclosure. FIG. 7 is a diagram illustrating an example of the hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is shown, a plurality of processors may be provided. Further, the processing may be executed by one processor, or the processing may be executed by two or more processors simultaneously or sequentially, or using other methods. Note that the processor 1001 may be implemented with one or more chips.

Each function of the base station 10 and the user terminal 20 is implemented by given software (program) being read on hardware such as the processor 1001 and the memory 1002, by which the processor 1001 performs operations, controlling communication via the communication apparatus 1004, and controlling at least one of reading or writing of data at the memory 1002 and the storage 1003.

The processor 1001 may control the whole computer by, for example, running an operating system. The processor 1001 may be implemented by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

The processor 1001 reads programs (program codes), software modules, data, etc. from at least one of the storage 1003 or the communication apparatus 1004 into the memory 1002, and performs various types of processing according to these. As the program, a program that causes a computer to execute at least a part of the operation described in the above-described embodiment is used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store programs (program codes), software modules, etc. that are executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk, a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus."

The communication apparatus 1004 is hardware (transmission/reception device) for performing inter-computer communication via at least one of a wired network or a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) or time division duplex (TDD). For example, the transmitting/receiving section 120 (220), the transmission/reception antenna 130 (230), and the like described above may be implemented by the communication apparatus 1004. The transmitting/receiving section 120 (220) may be implemented by being physically or logically separated into the transmitting section 120a (220a) and the receiving section 120b (220b).

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware.

(Variations)

Note that terms described in the present disclosure and terms necessary for understanding the present disclosure may be replaced with terms that have the same or similar meanings. For example, a channel, a symbol, and a signal (signal or signaling) may be replaced with each other. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may be comprised of one or more periods (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for at least one of transmission or reception of a given signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, or specific windowing processing performed by a transceiver in the time domain.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

The slot may include a plurality of mini slots. Each mini slot may include one or more symbols in the time domain. Further, the mini slot may be referred to as a subslot. Each mini slot may include fewer symbols than the slot. A PDSCH (or PUSCH) transmitted in a time unit larger than the mini slot may be referred to as "PDSCH (PUSCH) mapping type A". A PDSCH (or a PUSCH) transmitted using a mini slot may be referred to as PDSCH (PUSCH) mapping type B.

A radio frame, a subframe, a slot, a mini slot and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe or the TTI may be a subframe (1 ms) in the existing LTE, may be a period shorter than 1 ms (for example, one to thirteen symbols), or may be a period longer than 1 ms. Note that the unit to represent the TTI may be referred to as a "slot," a "mini slot" and so on, instead of a "subframe."

Here, a TTI refers to the minimum time unit of scheduling in radio communication, for example. For example, in the LTE system, a base station performs scheduling to allocate radio resources (a frequency bandwidth, transmission power, and the like that can be used in each user terminal) to each user terminal in TTI units. Note that the definition of TTIs is not limited to this.

The TTI may be a transmission time unit of a channel-coded data packet (transport block), a code block, a codeword, etc. or may be a processing unit of scheduling, link adaptation, etc. When the TTI is given, a time interval (e.g., the number of symbols) to which a transport block, a code block, a codeword, or the like is actually mapped may be shorter than the TTI.

Note that, when one slot or one mini slot is referred to as a "TTI," one or more TTIs (that is, one or multiple slots or one or more mini slots) may be the minimum time unit of scheduling. Also, the number of slots (the number of mini slots) to constitute this minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than the usual TTI may be referred to as a shortened TTI, a short TTI, a partial TTI (or fractional TTI), a shortened subframe, a short subframe, a mini slot, a subslot, a slot, or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in an RB may be determined based on a numerology.

Also, an RB may include one or more symbols in the time domain, and may be one slot, one mini slot, one subframe or one TTI in length. One TTI, one subframe, etc. may each be comprised of one or more resource blocks.

Note that one or more RBs may be referred to as a physical resource block (PRB), a sub-carrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a given numerology in a given carrier. Here, the common RB may be specified by the index of the RB based on a common reference point of the carrier. PRBs may be defined in a BWP and numbered within the BWP.

The BWP may include a BWP for UL (UL BWP) and a BWP for DL (DL BWP). For the UE, one or more BWPs may be configured within one carrier.

At least one of the configured BWPs may be active, and the UE may not assume to transmit or receive a given channel/signal outside the active BWP. Note that "cell", "carrier", etc. in the present disclosure may be replaced with "BWP".

Note that the structures of radio frames, subframes, slots, mini slots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

The information, parameters, etc. described in the present disclosure may be represented using absolute values, or may be represented using relative values with respect to given values, or may be represented using other corresponding information. For example, a radio resource may be specified by a given index.

The names used for parameters etc. in the present disclosure are in no respect limiting. Further, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, etc. described in the present disclosure may be represented using any of a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals, etc. can be output in at least one of a direction from a higher layer to a lower layer or a direction from a lower layer to a higher layer. Information, signals and so on may be input and output via a plurality of network nodes.

The information, signals and so on that are input and/or output may be stored in a specific location (for example, in a memory), or may be managed in a control table. The information, signals, and the like to be input and output can be overwritten, updated, or appended. The output information, signals, and the like may be deleted. The information, signals and so on that are input may be transmitted to other pieces of apparatus.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RRH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

The mobile station may be referred to as a subscriber station, mobile unit, subscriber station, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and mobile station may be called as a transmission apparatus, a reception apparatus, a radio communication apparatus, and the like. Note that at least one of the base station or the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station or the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, an uplink channel, a downlink channel, etc. may be replaced with a side channel.

Likewise, a user terminal in the present disclosure may be replaced with a base station. In this case, the base station 10 may have the functions of the user terminal 20 described above.

In the present disclosure, an operation performed by the base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, the methods described in the present disclosure have presented various step elements using an exemplary order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on."

All references to the elements using designations such as "first" and "second" as used in the present disclosure do not generally limit the amount or sequence of these elements.

These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may include a wide variety of operations. For example, "determining" may be regarded as "determining" judging, calculating, computing, processing, deriving, investigating, looking up (or searching or inquiring) (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

In addition, "determining" may be replaced with "assuming", "expecting", "considering", or the like.

The terms "connected" and "coupled" used in the present disclosure, or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

In the present disclosure, when two elements are connected together, it is conceivable that the two elements are "connected" or "coupled" to each other by using one or more electrical wires, cables, printed electrical connections, and the like, and, as some non-limiting and non-inclusive examples, by using electromagnetic energy having wavelengths in the radio frequency domain, microwave region, or optical (both visible and invisible) region, or the like.

In the present disclosure, the terms "A and B are different" may mean "A and B are different from each other". Note that the phrase may mean that "A and B are different from C". The terms such as "separate", "coupled", and the like may be interpreted similarly to "different".

When "include", "including", and variations of these are used in the present disclosure, these terms are intended to be inclusive similarly to the term "comprising". Moreover, the term "or" used in the present disclosure is intended to be not an exclusive-OR.

In the present disclosure, when articles are added by translation, for example, as "a", "an", and "the" in English, the present disclosure may include that nouns that follow these articles are plural.

In the above, the invention according to the present disclosure has been described in detail; however, it is obvious to those skilled in the art that the invention according to the present disclosure is not limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

What is claimed is:

1. A terminal comprising:
    a transmitter that transmits capability information indicating support of physical uplink control channel (PUCCH) repetitive transmission by multiple transmission and reception points (TRPs) in units of subslots;
    a receiver that receives information indicating a number of repetitions of the PUCCH repetitive transmission; and
    a processor that determines, based on the number of repetitions and a plurality of spatial relations configured for the PUCCH repetitive transmission, a spatial relation used for each repetition in the PUCCH repetitive transmission.

2. The terminal according to claim 1, wherein when the number of repetitions is equal to a number of the plurality of spatial relations, the processor applies the plurality of spatial relations in ascending order to respective repetitions in the PUCCH repetitive transmission.

3. The terminal according to claim 1, wherein when the number of repetitions is larger than a number of the plurality of spatial relations, the processor determines, based on a mapping pattern configured by a higher layer parameter, a spatial relation applied to each repetition in the PUCCH repetitive transmission.

4. A radio communication method for a terminal, comprising:
    transmitting capability information indicating support of physical uplink control channel (PUCCH) repetitive transmission by multiple transmission and reception points (TRPs) in units of subslots;
    receiving information indicating a number of repetitions of the PUCCH repetitive transmission; and
    determining, based on the number of repetitions and a plurality of spatial relations configured for the PUCCH repetitive transmission, a spatial relation used for each repetition in the PUCCH repetitive transmission.

5. A base station comprising:
    a receiver that receives capability information indicating support of physical uplink control channel (PUCCH) repetitive transmission by multiple transmission and reception points (TRPs) in units of subslots;
    a transmitter that transmits information indicating a number of repetitions of the PUCCH repetitive transmission; and
    a processor that determines, based on the number of repetitions and a plurality of spatial relations configured for a terminal for the PUCCH repetitive transmission, a spatial relation used for each repetition in the PUCCH repetitive transmission.

6. A system comprising a terminal and a base station, wherein
    the terminal comprises:
        a transmitter that transmits capability information indicating support of physical uplink control channel (PUCCH) repetitive transmission by multiple transmission and reception points (TRPs) in units of subslots;
        a receiver that receives information indicating a number of repetitions of the PUCCH repetitive transmission; and a processor that determines, based on the number of repetitions and a plurality of spatial relations configured for the PUCCH repetitive transmission, a spatial relation used for each repetition in the PUCCH repetitive transmission, and the base station comprises:

a transmitter that transmits the information indicating the number of repetitions.

\* \* \* \* \*